No. 722,686. PATENTED MAR. 17, 1903.
J. P. F. FLAIG.
WINDMILL.
APPLICATION FILED AUG. 5, 1901.
NO MODEL. 7 SHEETS—SHEET 2.
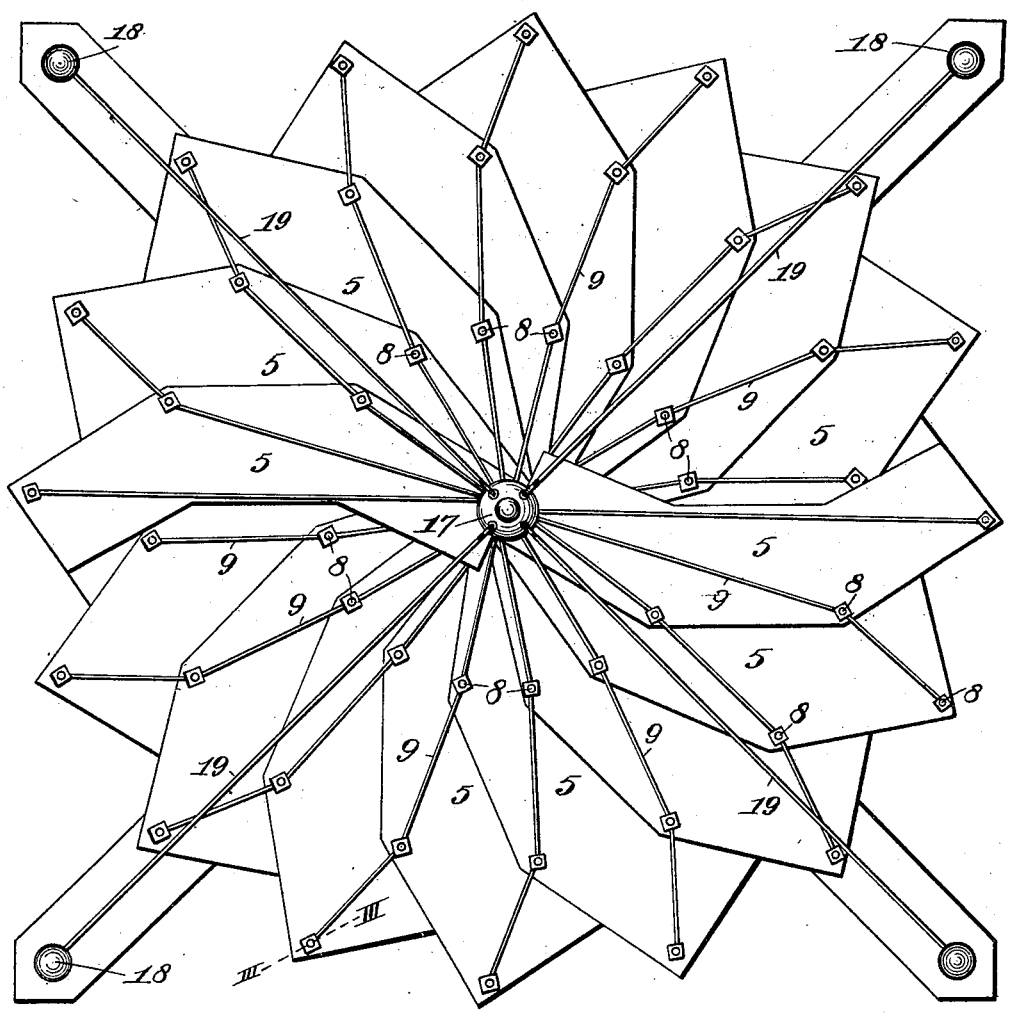
Fig. II.
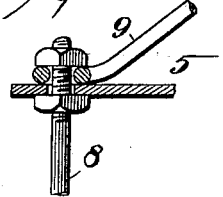
Fig. III.
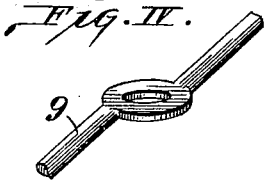
Fig. IV.
Attest:
M. P. Smith
E. S. Knight
Inventor:
J. P. F. Flaig;
By Wright Bro.
Atty's.

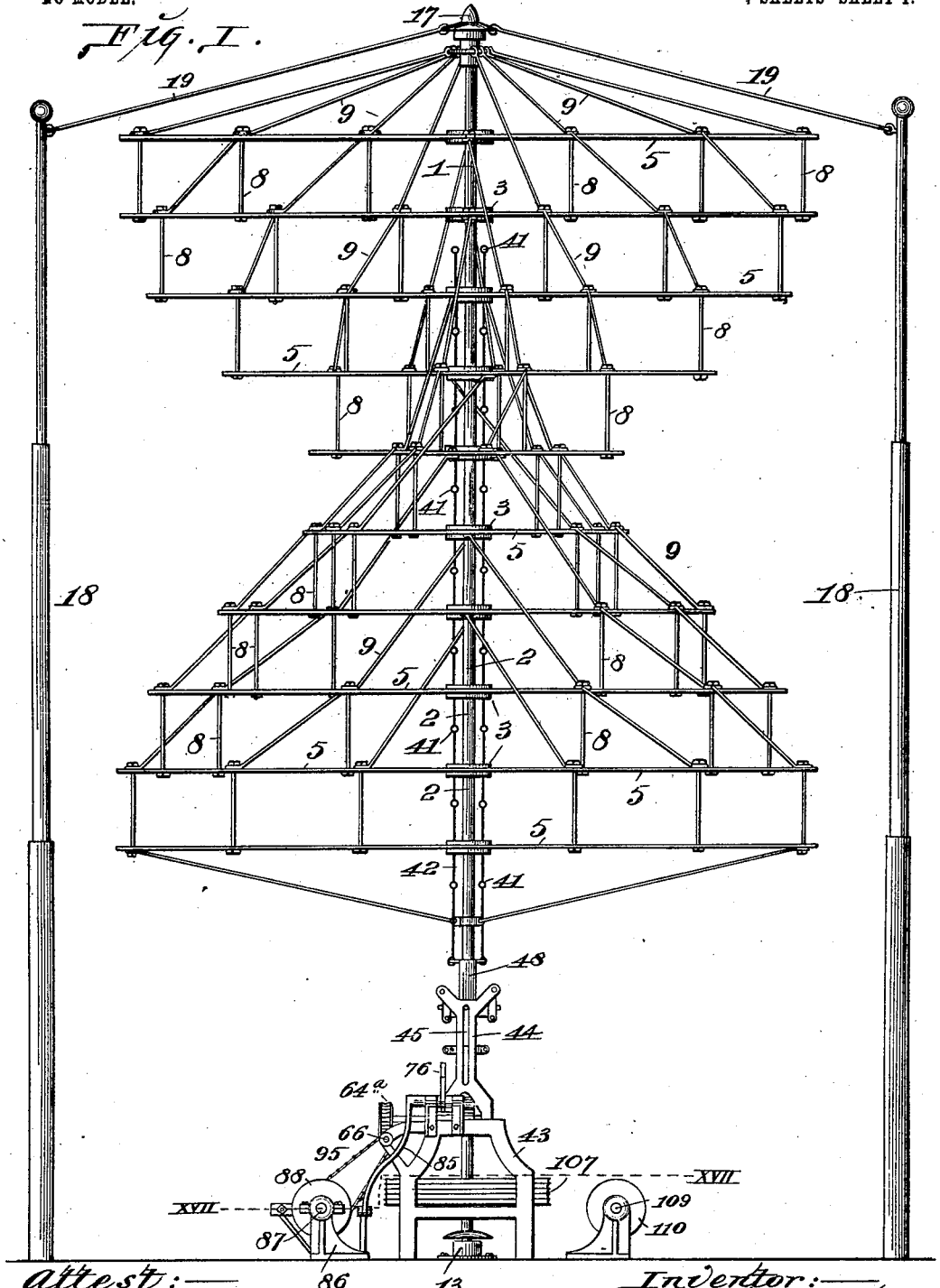

No. 722,686. PATENTED MAR. 17, 1903.
J. P. F. FLAIG.
WINDMILL.
APPLICATION FILED AUG. 5, 1901.
NO MODEL. 7 SHEETS—SHEET 3.
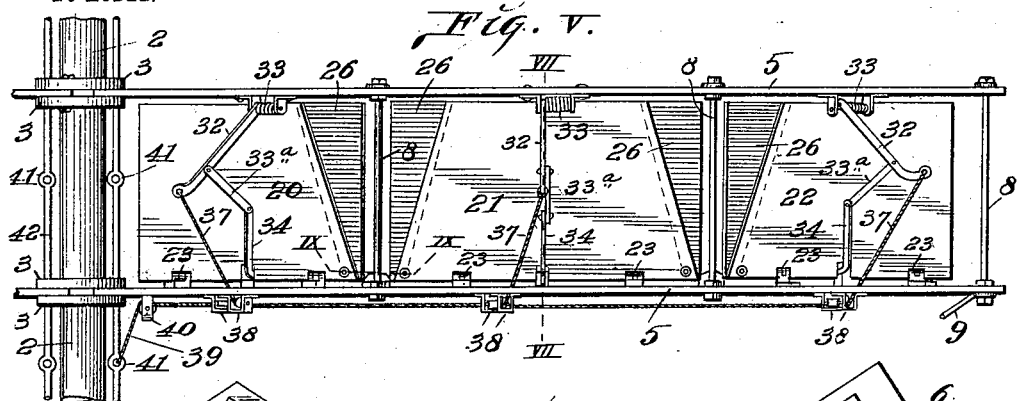
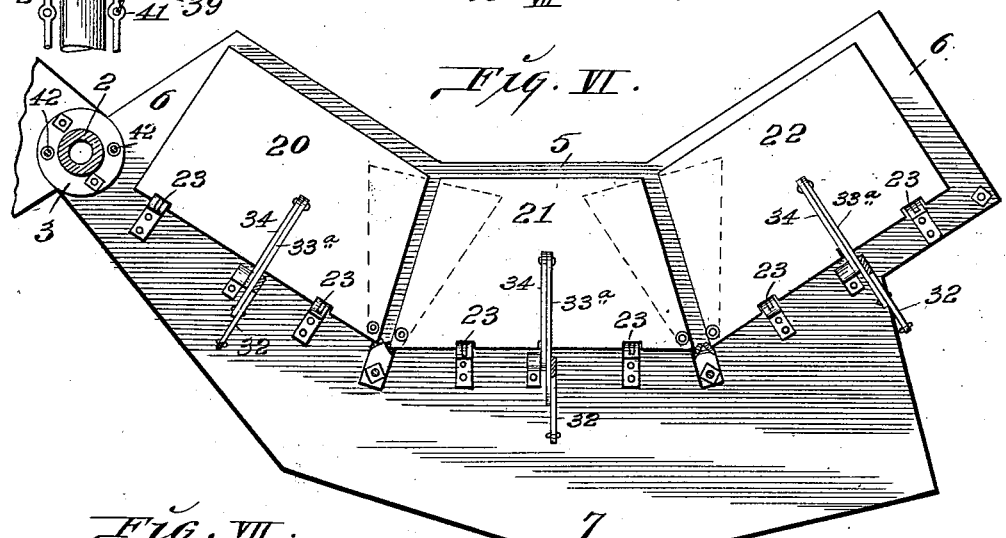
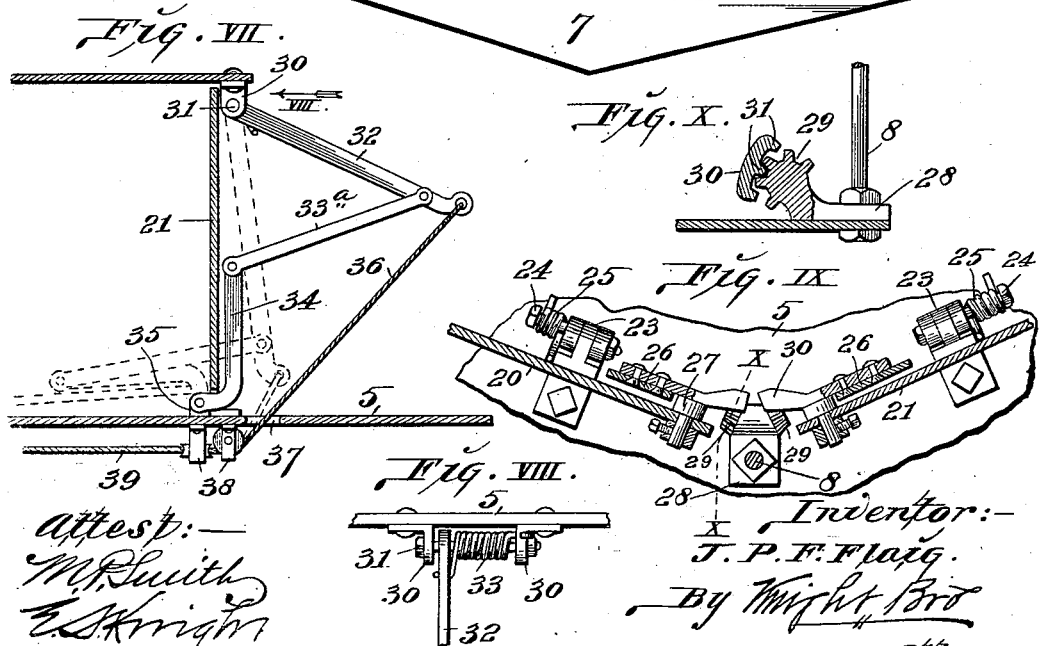
Attest:—
M. F. Smith
E. S. Knight
Inventor:—
J. P. F. Flaig.
By Knight Bro
Atty's No. 722,686. PATENTED MAR. 17, 1903.
J. P. F. FLAIG.
WINDMILL.
APPLICATION FILED AUG. 5, 1901.
NO MODEL. 7 SHEETS—SHEET 4.
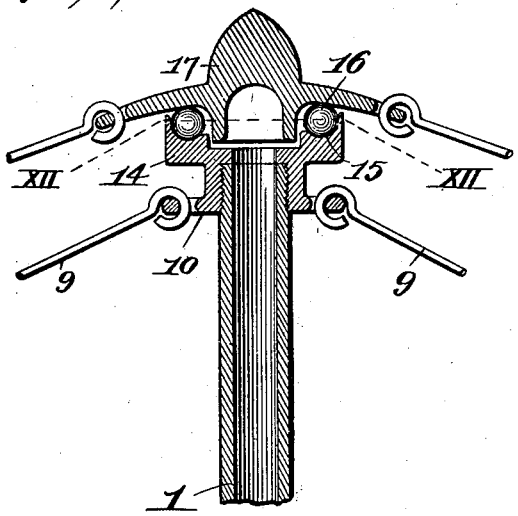
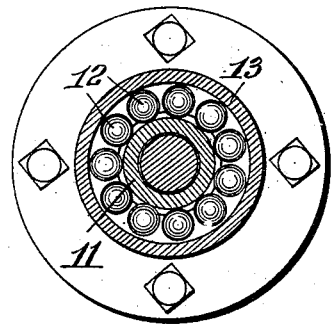
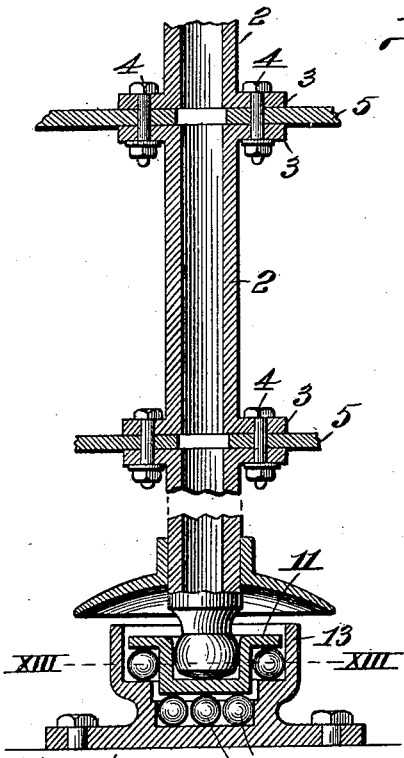
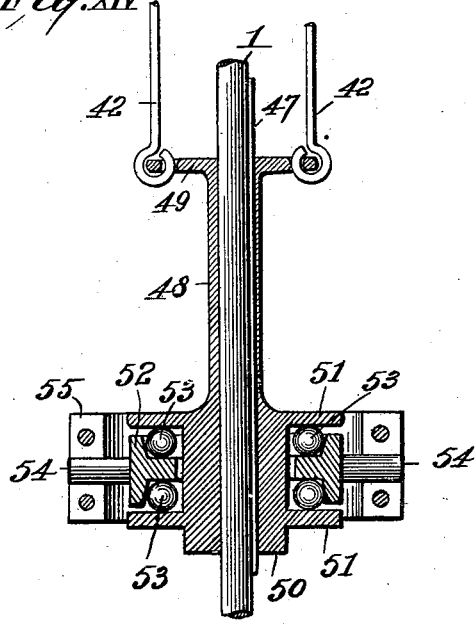
Inventor:—
J. P. F. Flaig.
By Knight Bro.
atty's
Attest:—

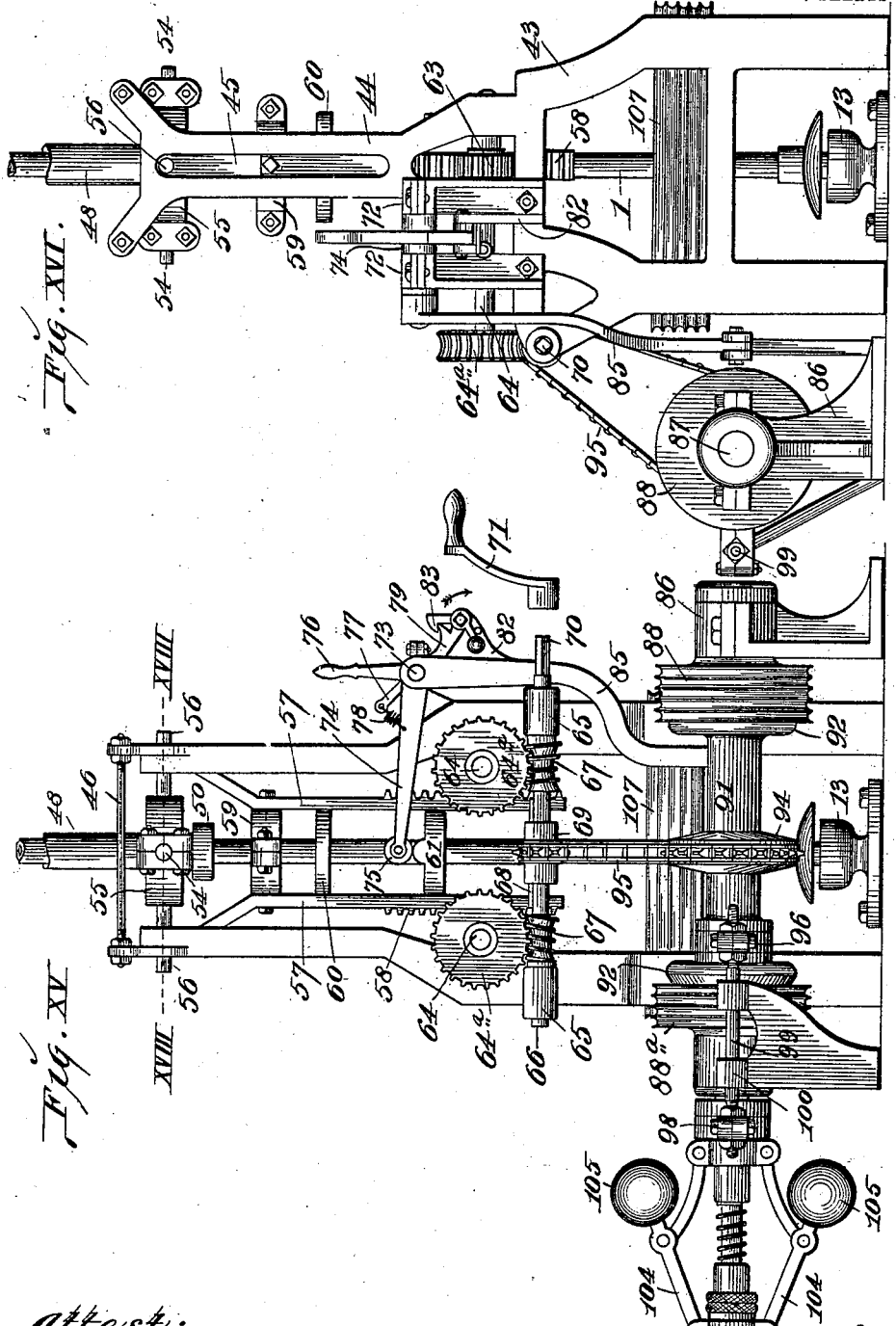

No. 722,686. PATENTED MAR. 17, 1903.
J. P. F. FLAIG.
WINDMILL.
APPLICATION FILED AUG. 5, 1901.
NO MODEL. 7 SHEETS—SHEET 6.
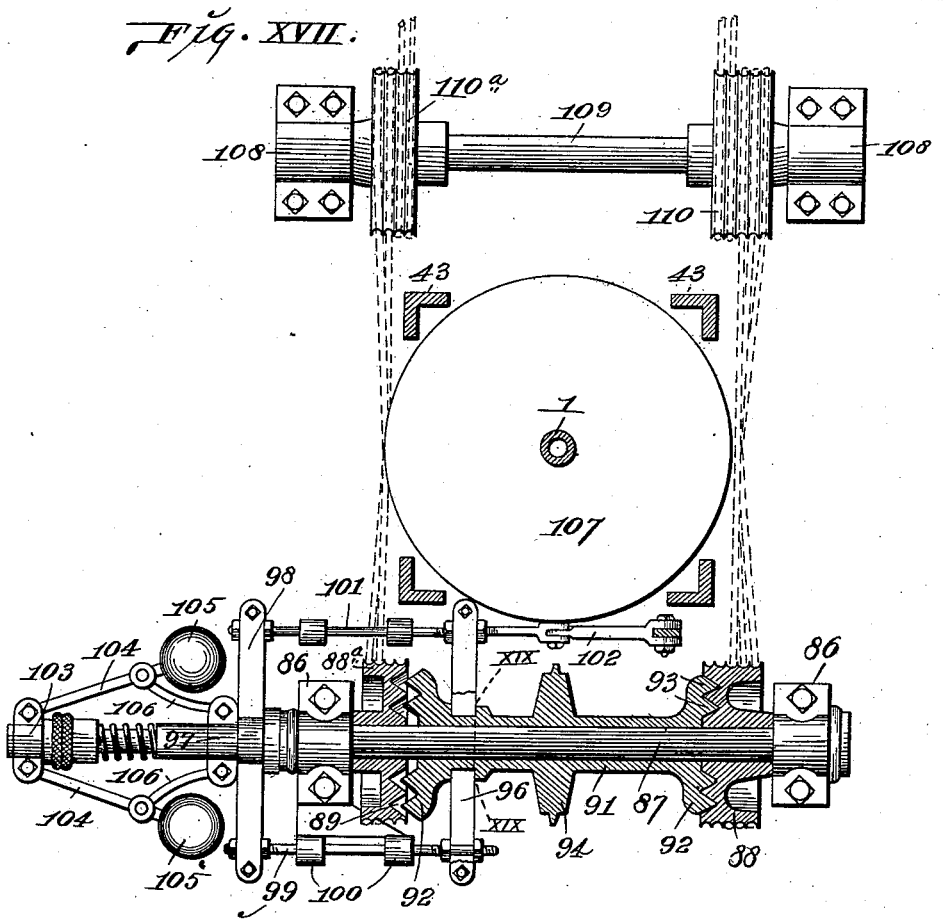
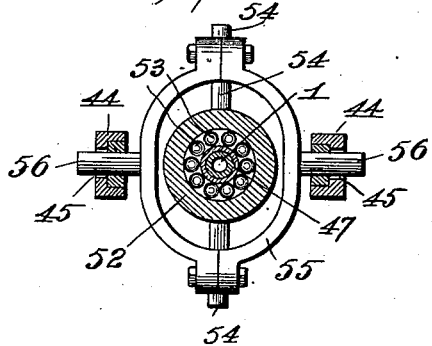
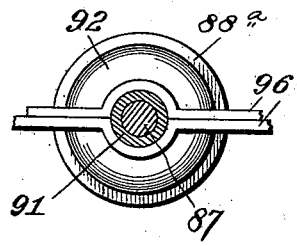
Attest:—
Inventor:—
J. P. F. Flaig;
By Att'ys.

No. 722,686. PATENTED MAR. 17, 1903.
J. P. F. FLAIG.
WINDMILL.
APPLICATION FILED AUG. 5, 1901.
NO MODEL. 7 SHEETS—SHEET 7.
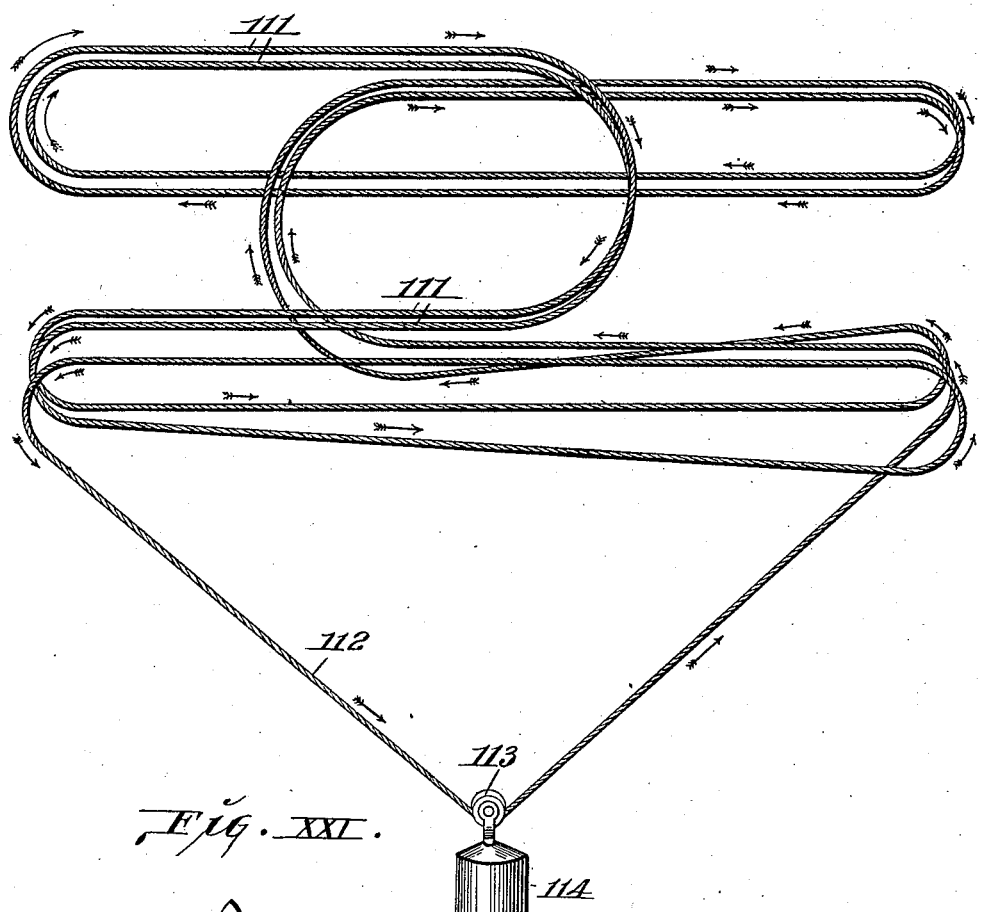
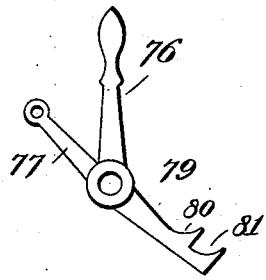
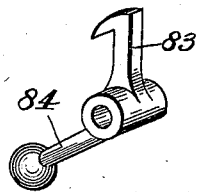

UNITED STATES PATENT OFFICE.

JOSEPH P. F. FLAIG, OF ST. LOUIS, MISSOURI.

WINDMILL.

SPECIFICATION forming part of Letters Patent No. 722,686, dated March 17, 1903.

Application filed August 5, 1901. Serial No. 70,930. (No model.)

*To all whom it may concern:*

Be it known that I, JOSEPH P. F. FLAIG, a citizen of the United States, residing in the city of St. Louis and State of Missouri, have invented certain new and useful Improvements in Windmills, of which the following is a full, clear, and exact description, reference being had to the accompanying drawings, forming part of this specification.

The invention consists in features of novelty hereinafter fully described, and pointed out in the claims.

Figure I is a side elevation of the entire framework of my improved windmill and the governor therefor, the sails not being shown in this view. Fig. II is a plan view of the windmill, showing the spiral arrangement of the plates and the braces therefor. Fig. III is an enlarged sectional view taken on the line III III, Fig. II. Fig. IV is a perspective view of a portion of one of the braces and showing an eye therein. Fig. V is an elevation showing a pair of the horizontally-disposed plates, the sails between said plates, and the operating mechanism for said sails. Fig. VI is a plan view of the lowermost one of the horizontal plates seen in Fig. V and showing the sails in a folded position thereupon. Fig. VII is an enlarged vertical sectional view taken on line VII VII, Fig. V. Fig. VIII is an enlarged detail elevation taken looking in the direction indicated by the arrow VIII, Fig. VII. Fig. IX is an enlarged horizontal sectional view taken on the line IX IX, Fig. V, and showing the hinged connection between the sails and the folding sections thereof. Fig. X is an enlarged detail sectional view taken on the line X X, Fig. IX. Fig. XI is a vertical sectional view taken through the center of the mast or center shaft of the windmill, parts thereof being broken away and showing the bearings at the top and bottom of said mast. Fig. XII is a horizontal sectional view taken on the line XII XII, Fig. XI. Fig. XIII is a horizontal sectional view taken on the line XIII XIII, Fig. XI. Fig. XIV is a vertical sectional view of a sleeve that connects the lower ends of the sail-operating rods with the governor of the windmill. Fig. XV is a front elevation of the governor of the windmill. Fig. XVI is a side elevation of the governor. Fig. XVII is an enlarged horizontal sectional view taken on the line XVII XVII, Fig. I. Fig. XVIII is a horizontal sectional view taken on the line XVIII XVIII, Fig. XV. Fig. XIX is a detailed sectional view taken on the line XIX XIX, Fig. XVII. Fig. XX is a diagrammatic perspective view of an endless rope or cable that is driven by the windmill and which operates over suitably-arranged driving-pulleys. Fig. XXI is a detail elevation of an operating-handle made use of in the governor; and Fig. XXII is a perspective view of a weighted detent which engages a part of the operating-handle seen in Fig. XXI.

Referring by numerals to the accompanying drawings, 1 designates the mast or upright shaft, which is made up of a series of uniformly-sized tubular sections 2, the ends of which are flanged, as shown by 3. The meeting flanges on the ends of the tubular sections 2 are rigidly connected by bolts 4 or in any suitable manner, and the inner ends of the horizontally-arranged plates 5 are clamped between the flanges 3. These plates 5, between which are arranged the sails of the windmill, are arranged in pairs on opposite sides of the mast 1, each pair occupying the same horizontal plane. These plates 5 are preferably constructed of sheet metal irregular in outline, as seen in Fig. VI, with the ends 6 of each plate occupying oppositely-disposed angles of approximately thirty degrees relative the central portion of said plate. Each plate, with the exception of the extreme top and bottom pair of plates, is provided on its front edge with an extending portion 7, which overlaps the body portion of the next lower plate. The entire series of pairs of plates are arranged spirally around the mast 1, each succeeding lower pair of plates being located slightly in advance of the adjacent upper pair of plates, and by this arrangement the plates make one complete turn around the mast. This arrangement is for the purpose of accommodating a large number of sails and also to always allow a certain number of the sails to be open to the wind. By arranging these plates 5, which carry the sails, as hereinafter described, in tiers each set of sails is at all times free to the full sweep of the wind and not shielded in any manner by any of the other sets of sails. Each plate is joined to the next adjacent plate by a series of vertically-arranged tie-rods 8, and all of the plates are braced or tied to the mast and to each other by the braces 9, which extend from the heads of the tie-rods 8 to the heads of the next adjacent tie-rods 8. (See Figs. I, II, III, and IV.)

The tie-rods 9 from the upper pairs of plates 5 are connected to a flange 10, arranged at the upper end of the mast 1. The lower end of the mast 1 is seated in a socket 11, which is rotatably arranged on ball-bearings 12, positioned in a fixed cup or socket 13. At the upper end of the mast 1 is located a plate 14, in the top of which is formed a continuous groove 15, occupied by ball-bearings 16, and a plate 17 bears directly upon said ball-bearings 16. Arranged at suitable distance away from the mast 1 are upright posts 18, the upper ends of which are connected to the plate 17 by the guy-rods 19. (See Figs. I and II.)

By the construction just described the mast or center shaft is rotatably held in an upright position.

The sails of my improved windmill, of which three are a set, occupy positions between the horizontally-arranged plates 5. These sails are preferably constructed of sheet metal approximately rectangular in form, the sail nearest the mast being designated by the numeral 20, the central sail 21, and the outer sail 22. The lower edges of these sails 20, 21, and 22 are connected by suitable hinges 23 to the lower mast 1 of a pair of adjacent plates 5, and around the hinge-pins 24 of each pairs of hinges are located coil-springs 25, the upper ends of which bear against the inner faces of the sails and the lower ends of which bear against the face of the plate 5. The tendency of these coil-springs 25 is to throw the sails into vertical positions; but the weight of each sail is such that it nearly overcomes the resistance offered by these springs. Consequently said sails normally occupy an almost flat position upon the plates 5. (See Fig. VI.)

The sails 20 and 22 are hinged upon the ends 6 of the plate 5 and are consequently at an angle relative the center sail 21, and when all of the sails fold downwardly onto the plate to which they are hinged the outer meeting corners of said sails would interfere with one another were it not for the fact that the ends of the center sail are cut off on an angle relative the front and rear edges and the adjacent edges of the inner and outer sails 20 and 22 are cut off on corresponding angles. To close the spaces formed by cutting off the ends of the sails when said sails are open or in a vertical position, I provide triangular plates 26, which are connected by pivotal hinges 27 to the lower corners of the central sail 21 and to the adjacent corners of the sails 20 and 22.

Held by means of the tie-rods or bolts 8 to the face of the lower one of the adjacent pair of plates 5 at points adjacent the meeting corners of the sails 20, 21, and 22 are plates 28, the inner ends of which are provided with a pair of oppositely-arranged bevel-gear faces 29. Extensions 30 of the pivotal hinges 27 are provided on their inner faces with gear-teeth 31, which mesh with the bevel-gear faces 29. (See Figs. IX and X.)

By the construction just described the triangular plates 26 swing or fold into out-of-the-way positions beneath the ends of the sails 21 and adjacent ends of the sails 20 and 22 when the three sails swing downwardly onto the lower plate 5.

It is obvious that when the sails are in a vertical position the gearing just described causes the plates 26 to swing into positions closing the spaces caused by the cutting off of the ends of the sails. (See Fig. V.)

Positioned on the under side of the uppermost one of each pair of plates 5 and immediately opposite a point occupied by the top of each sail when it is in a vertical position is a pair of ears 30, each pair of which carry a hinge-pin 31, to which is pivotally connected the upper end of a lever 32. A coil-spring 33 occupies a position around each hinge-pin, one end of each spring being hooked around the pin, the opposite end being engaged beneath the upper end of the lever 32. Each lever 32 is connected by a link 33$^a$ to a lever 34, the lower end of which is pivotally connected to a bracket 35, fixed upon the lowermost one of the pair of plates 5 at a point below the center of each of the three sails. The levers 34 bear against the outer faces of the lower portions of the sails. Secured to the free ends of the levers 32 are the ends of flexible cables 36, which pass downwardly through apertures 37, formed in the lowermost one of the pair of plates 5, and after passing around grooved pulleys 38, suitably located on the end side of said plate 5, said cables are united with a single cable 39, which passes along beneath the lower plate 5 to a point adjacent the mast 1. At this point the cable 39 passes over a grooved pulley 40 and from thence downwardly a short distance, and its end is secured to one of a series of eyes 41, which are formed in a rod 42. This rod 42 is one of a pair that is located on opposite sides of the mast 1 and operating through apertures formed in the flanges 3 of the sections 2, forming said mast. There are necessarily two of these rods 42—one for operating all of the cables on each side of the mast 1. (See Figs. I and V.)

Located on each side of the base of the mast 1 are the vertically-arranged side frames 43, which support the greater part of the mechanism of the windmill-governor, now to be described.

Each side frame 43 is surmounted by a vertical extension 44, provided with a vertically-arranged slot 45, the upper ends of these vertical extensions being joined by the tie-rods 46. Arranged to slide upon a feather 47, carried by the mast 1 at a point between the outer ends of the extensions 44, is a sleeve 48. Formed integrally with the upper end of this sleeve is a flange 49, to which the lower ends of the rods 42 are secured. The lower end of the sleeve 48 is provided with a head 50, from which extends outwardly a pair of flanges 51. Between these flanges 51 is arranged a ring 52, there being ball-bearings 53 located between the top and bottom faces of said ring and the flanges 51. The ring 52 is provided with a pair of oppositely-arranged pins 54, that are loosely mounted in the ends of an oblong ring 55, located around the first-mentioned ring 52. The ring 55 is provided with a pair of oppositely-arranged pins 56, which occupy positions at right angles to the pins 54, said pins 56 extending outwardly through the slots 45 in the extensions 44 and through the upper ends of a pair of vertically-arranged bars 57, which operate between and bear against the inner faces of the upper ends of the extensions 44. By the construction just described the sleeve 48 rotates with and slides vertically upon the mast 1, and a flexible bearing is formed for the mast at a point between the upper ends of the extensions 44 to allow for any bending or swerving of the mast out of a vertical line due to excessive wind strain upon the sails. The outer faces of the lower ends of the bars 57 are formed into the racks 58, and joining said bars adjacent their upper ends is a ring 59. (See Fig. XV.)

The ring 60 is located between the bars 57 a short distance below the ring 59, and a third ring 61 is positioned between the bars a short distance below the ring 60. The racks 58 mesh with pinions 63, that are carried upon horizontally-arranged shafts 64, that are rotatably mounted in suitable bearings formed in the upper portions of the side frames 43. These shafts 64 extend beyond the front side frames 43 and are there provided with the worm gear-wheels 64ᵃ. Extending transversely across the front of the side frames 43 and rotatably mounted in bearings 65, carried by said side frames, is a shaft 66, on which are rigidly fixed the worms 67, which mesh with the worm-gears 64. The center of the shaft 66 is provided with a feather 68, and upon this portion of said shaft is arranged a small sprocket-wheel 69. One end of the shaft 66 is squared, as indicated by 70, to receive a crank-handle 71. Rotatably mounted in bearings 72, that are fixed to the right-hand side frame a short distance above the shaft 66, is a shaft 73, upon which is rigidly fixed the outer end of a lever 74. The inner end of this lever 74 extends to a point between the front portions of the rings 60 and 61 and is there provided with an anti-friction-roller 75, which is adapted to be engaged by the front portions of said rings 60 and 61. Upon this shaft 73, adjacent the lever 74, is loosely mounted a hand-lever 76, that is provided with an upwardly-projecting finger 77, and a retractile coil-spring 78 connects the end of this finger with the lever 74. Formed integrally with the lower end of the lever 76 is a downwardly and outwardly extending finger 79, that is provided with a pair of notches 80 and 81. (See Fig. XXI.)

Pivotally held upon a bracket 82, that is formed integrally with one of the bearings 72, is a pawl 83, the hooked end of which is adapted to engage in either one of the notches 80 and 81. This pawl 83 is provided with a downwardly and inwardly extending weighted arm 84, which normally holds the pawl in a vertical position. Rigidly fixed upon the front end of the shaft 73 is the upper end of a curved lever 85, which extends downwardly to a point in front of the right-hand one of the side frames 43. Rigidly mounted in bearings 86, located in front of the side frames 43, is a shaft 87, upon which just inside the bearings 86 is the loosely-mounted grooved sheave 88 and a fixed grooved sheave 88ᵃ. In the inner face of each sheave is formed a pair of concentric V-shaped grooves 89, carried by the shaft 87, and arranged to slide upon said shaft between the sheaves 88 and 88ᵃ is a sleeve 91, each end of which is provided with a flange 92, upon the outer face of which is formed a pair of concentric V-shaped ribs 93, that are adapted to frictionally engage in the V-shaped grooves of the sheaves 88 and 88ᵃ. This sleeve 91 is slightly shorter than the distance between the sheaves 88 and 88ᵃ. Therefore when the ribs 93 on one of the disks engage in the grooves 89 in one of the sheaves the ribs on the opposite flange are disengaged from the corresponding pair of grooves 89. (See Fig. XVII.)

Formed integrally with the sleeve 91 is a sprocket-wheel 94, around which passes a sprocket-chain 95, that also passes around the sprocket-wheel 69, previously mentioned.

Rotatably positioned upon the sleeve 91, adjacent the left-hand disk 92, is a horizontally-disposed yoke 96, and rotatably arranged upon a sleeve 97 outside the left-hand bearing 86 is a similar yoke 98. The front ends of the yokes 96 and 98 are rigidly connected by a rod 99, which is arranged to slide in bearings 100, arranged in front of the left-hand bearing 86. Rigidly connecting the rear ends of these yokes 98 is a rod 101, the right-hand end of which is extended beyond the yoke 96 and is connected to the lower end of the lever 85 by a link 102.

Fixed upon the extreme left-hand end of the shaft 87 is a collar 103, to which is pivoted a pair of arms 104, that carry governor-balls 105. Links 106 connect the arms 104 with the sleeve 97. Rigidly fixed upon the mast 1 in approximately horizontal alinement with the upper portions of the sheaves 88 is the horizontally-arranged enlarged sheave 107. Rotatably mounted in suitable bearings 108 and the rear of the sheave 107 and the side frames 43 is a shaft 109, upon which is a loosely-mounted sheave 110 and a fixed sheave 110ᵃ, which are counterparts of and in direct alinement with the sheaves 88 and 88ª. An endless cable 111 passes around the sheaves 88 and 88ª, 110 110ª, and the large sheave 107 in the manner clearly shown in Figs. XVII and XX, said cable being for the purpose of transmitting the motion of the windmill to said sheaves 88, 88ª, 110, and 110ª.

To compensate for any lengthening or shortening of cable due to atmospheric changes, said cable is of such a length as that a depending loop 112 is formed between a pair of the sheaves on the oppositely-arranged shafts 87 and 109, and a grooved roller 113 is arranged upon the cable in said loop, and said grooved roller is equipped with a weight 114, which is sufficiently heavy to always maintain the cable in a taut condition.

When my improved windmill is in operation, the various sets of sails as they come into the wind by the rotation of the entire mill are swung upwardly into vertical positions by the wind, and the pressure upon the now open sails causes the entire windmill to revolve upon the ball-bearings 12 and beneath the ball-bearings 16. In making a complete revolution the sails are open to the wind during half a revolution, and during the remaining half of the revolution and while said sails are passing through the wind they automatically swing downwardly onto the plates 5, thus presenting little or no resistance to the wind until they complete the revolution, when they are again caught by the wind and swung upwardly into vertical positions. By arranging the plates 5 and sets of sails spirally around the center shaft or mast there is always a number of sails open to the wind and a corresponding number of the sails are closed, and for this reason the rotation of the entire mill is very uniform and free from sudden jerks or strains, which might tend to cause some of the parts to become inoperative.

The rotary motion of the main shaft or mast and the large sheave 107, carried thereby, is transmitted by the cable 111 to the sheaves 88, 88ª, 110, and 110ª. The shaft 87 will be rotated in its bearings for the reason that the sheave 88ª is fixed upon said shaft.

Assuming that the various parts of the governor are positioned as seen in Figs. XV, XVI, and XVII and the windmill commences to rotate above its normal speed, owing to the high wind-pressure, the governor-balls 105 will swing outwardly upon their arms 104, carried by the roller 103, that is fixed upon the shaft 87. As said balls swing outwardly the sleeve 97 is moved toward the left upon the shaft 87. Consequently the yokes 98 and 96 and connecting-rods 99 and 101 move with said sleeve 97. The yoke 96 thus being moved carries the V-shaped ribs 93 of the left-hand flange 92 into frictional engagement with the V-shaped grooves 89, and as soon as this frictional engagement takes place the sleeve 91 will necessarily rotate with the shaft 87 and sheave 88ª, and this rotary motion is imparted to the shaft 66 and worms 67 thereupon by means of the sprocket-chain 95, which passes around the sprocket-wheel 69, carried by the shaft 66. As the sleeve 91 shifts upon the shaft 87 the sprocket-wheel 69 correspondingly shifts on the feathered portion of the shaft 66. Rotary motion thus being imparted to the shaft 66 will be in turn imparted to the shafts 64 by means of the worms 67, meshing with the worm-wheels 64, and the pinions 63, carried upon the shafts 64, will engage with the racks 58 and cause the bars 57, carrying said racks, and the rings 60 and 61 and other parts of the mechanism that are fixed to said bars to descend. The upper end of the bars 57, engaging the pins 56, carried by the ring 55, will draw said ring and the various parts carried thereby downwardly, and the rods 42, that are fixed to the flange of the sleeve 48 at the lower ends, will be likewise drawn downwardly, and this downward pull transmitted to all of the cables 39 and branch cables 36 will cause the levers 32 and 34 to swing downwardly into the positions shown by dotted lines in Fig. VII, thus throwing the sails downwardly out of the wind, and as a result thereof the windmill will slacken speed. As soon as the speed of the mill slackens, the governor-balls will of course swing inwardly toward the shaft 87, and as a result thereof the ribs on the left-hand one of the flanges 92 will be disengaged from the grooves in the sheave 88ª, and thus the rotary motion of the sleeve 91, which is imparted to the shafts 66 and 64, ceases. As long as the mill is running at a normal speed the sleeve 91 remains in a central position upon the shaft 87, with the ribs 93 disengaged from the grooves 89 in the sheaves 88 and 88ª. Should the windmill run below its normal speed, due to the retaining of the sails too close to the plates 5 by the regulating-levers 32 and 34 during a light wind, the governor-balls 105 will, as the mill slows down, move inwardly toward the shaft 87. As this action takes place the yokes 96 and 98 will be moved to the right and the sleeve 91 will be moved likewise, and the ribs 93 on the right-hand flange 92 will engage in the grooves in the sheave 88, which, as heretofore described, is rotating in an opposite direction from the shaft 87. As soon as this frictional engagement takes place the sprocket-chain 95 drives the shaft 66, worms 67, worm-wheels 64ª, shaft 64, and pinions 63 in directions opposite from the rotation during the previous engagement. This reverse movement elevates the bars 57, consequently elevating the sleeve 48 and rods 42, and as said rods are elevated the cables 39 and 36 are loosened and the coil-springs 33 will exert a pressure to draw said cables outwardly and to swing the levers 32 and 34 upwardly and outwardly. This action allows the sails when caught by the wind to swing a greater distance upwardly or into a more open position, where they will receive greater wind-pressure, and therefore the motion of the windmill is increased until the normal speed is reached. As soon as this normal speed is reached the governor-balls 105 will swing outwardly to their normal positions, thereby disengaging the ribs 93 of the right-hand flange 92 from the grooves in the sheave 88 and moving the sleeve 91 into a central disengaged position upon the shaft 87. Thus the governor very accurately regulates the speed of the windmill by automatically opening and closing the sails corresponding to the low and high speed or pressure of the wind.

The levers 74, 85, and hand-lever 76 comprise a safety device which effectually prevents any of the parts of the governor and the contiguous mechanism from becoming broken should the bars 57 move too far downwardly. This extreme downward movement might be caused from continued rotation of the windmill resulting from momentum, or it might result from a break of the driving rope or connection between the windmill and machinery which it is driving, which would thus allow the windmill to rotate after the governor had closed the sails or swung the same into a horizontal position, which of course is the extreme limit of the downward movement of the governing mechanism. Should from any of these causes the bars 57 continue to move downwardly after the sails are closed or swung downwardly, the ring 60 strikes the antifriction-roller 75, thus moving the outer end of the lever 74 downwardly and in turn slightly rocking the shaft 73. This rocking motion moves the lever 85 slightly to the right, and the lower end of said lever being connected to the yoke 96 by means of the link 102 said yoke and the sleeve 91 carried thereby will be quickly and positively moved to the right and to its central position upon the shaft 87. The reverse of this movement just described is accomplished by positioning the ring 61 between the racks 58, which ring engages against the antifriction-roller 75 on the upward movement of the bars 57, and this action prevents any excessive upward movement of the bars 57 and contiguous mechanism. This excessive upward movement of the bars would result from light wind-pressure not strong enough to operate the mill at its normal speed, at which time the governor would tend to operate the mechanism to swing the sails farther than a perpendicular line, the sails being so positioned when the racks 57 and contiguous mechanism reach their upward limit of movement.

In starting the mill the hand-lever 76 is so manipulated that the hooked end of the pawl 83 engages the notch 81, this operation slightly elevating the lever 74, rocking the shaft 73, and moving the lever 85, so as to bring the sleeve 91 into a central position upon its shaft 87. The operator now places the crank-handle 71 upon the squared end of the shaft 76 and rotates said shaft in such a direction as that the bars 57 are raised to allow the sails to open sufficiently to receive sufficient wind-pressure to rotate the mill. As soon as the mill is in motion the hooked end of the pawl 83 is disengaged from the notch 81 and the position of said pawl is reversed—that is, the hooked end of said pawl is swung downwardly, as indicated by the arrow in Fig. XV, until the weighted end of said pawl passes the center and retains said pawl in its reversed position. The windmill is now free to operate and requires no attention until it is desired to bring the mill to a stop.

When the windmill is in motion and it is desired to stop the same, the pawl 83 is returned to its normal position after the lever 76 has been moved to such a position as that the hooked end of said pawl engages in the notch 81, this operation, by means of the lever 85, moving the sleeve 91 to the left until the ribs on the left-hand flange 92 frictionally engage in the grooves 89 in the sheave 88$^a$. As a result of this frictional engagement the sleeve 91 rotates with the shaft 87, as previously described, and the bars 57 will descend, thus swinging the sails downwardly until the wind-pressure against said sails is insufficient to rotate the mill. The mill might, however, stop before the sails are swung into a horizontal position upon the plates 5, and in this case the lever 76 is moved and the hooked end of the pawl engaged in the notch 81, thus bringing the sleeve 91 to its central position, and by means of the crank-handle 71, operating the shaft 66, the bars 57 are caused to descend until the sails lie horizontally upon the plates 5.

I claim as my invention—

1. In a windmill, a rotatably-arranged mast comprising a series of tubular sections suitably joined together, a plurality of plates secured in pairs between the tubular sections of the mast, sails arranged at angles relative to one another and hinged at their lower edges to the plates, the adjacent edges of which sails are cut off to allow said sails to swing downwardly onto the plates, and means whereby all of the sails are simultaneously swung upon their hinges, substantially as specified.

2. In a windmill, a rotatably-arranged mast, a plurality of plates spirally arranged around said mast, sails arranged at angles relative to one another and hinged at their lower edges to the plates, the adjacent edges of which sails are cut off to allow said sails to swing downwardly onto the plates, hinged sections at the cut-off ends of said sails, means whereby said sections are swung upon their hinges as said sails swing upon their hinges, and means whereby all of the sails are simultaneously swung upon their hinges, substantially as specified.

3. In a windmill, a rotatably-arranged mast, a plurality of plates spirally arranged around said mast, sails arranged at angles relative to one another and hinged at their lower edges to the plates, the adjacent edges of which sails are cut off to allow said sails to swing downwardly onto the plates, hinged sections at the cut-off ends of said sails, mechanism arranged between the plates behind the sails for limiting the upward swing of said sails, and a governor for uniformly and simultaneously regulating the position of all the sail-limiting mechanism, substantially as specified.

4. In a windmill, a rotatably-arranged mast, a plurality of plates spirally arranged around said mast, sails hinged at their lower edges to said plates, a sheave carried by the lower end of the mast, a pair of horizontally-arranged shafts rotatably mounted on opposite sides of said sheave, a governor mechanism mounted upon one of said shafts for regulating the swinging of the sails carried by the plates, smaller sheaves mounted upon the oppositely-arranged shafts, and a driving-rope passing around the large sheave and the smaller sheaves, substantially as specified.

5. In a windmill, a rotatably-arranged mast, a plurality of horizontally-disposed plates spirally arranged around said mast, sails arranged at angles relative to one another and hinged at their lower edges to the plates, the adjacent edges of which sails are cut off to allow said sails to be swung downwardly onto the plates, hinged sections at the cut-off ends of said sails and means whereby said sections are swung upon their hinges as said sails swing upon their hinges, substantially as described.

6. In a windmill, a rotatably-arranged mast, a plurality of plates spirally arranged around said mast, sails hinged at their lower edges to said plates, a sheave carried by the lower end of the mast, a pair of horizontally-arranged shafts rotatably mounted on opposite sides of said sheave, a governor mechanism mounted upon one of said shafts for regulating the swinging of the sails carried by the plates, smaller sheaves mounted upon the oppositely-arranged shafts, a driving-rope passing around the large sheave and the smaller sheaves, in which rope is formed a depending loop, and a weighted pulley carried by said loop for taking up the slack of the rope, substantially as specified.

7. In a windmill, a rotatably-arranged mast, a series of horizontal plates spirally arranged around said mast, a plurality of sails arranged at angles relative to one another between each adjacent pair of plates, a sheave carried by the lower end of the mast, a pair of horizontally-arranged shafts rotatably mounted on opposite sides of said sheaves, a governor mechanism mounted upon one of said shafts for regulating the swing of the sails arranged between the plates, small sheaves mounted upon the oppositely-arranged shafts, a driving-rope passing around the large sheave and the small sheaves, in which rope is a depending loop and a weighted pulley carried by said loop for taking up the slack of the rope, substantially as specified.

In testimony whereof I have hereunto affixed my signature this 30th day of July, 1901.

JOSEPH P. F. FLAIG.

In presence of—
  E. S. KNIGHT,
  M. P. SMITH.